United States Patent [19]
Fischer et al.

[11] Patent Number: 4,694,043
[45] Date of Patent: Sep. 15, 1987

[54] ADHESIVES WITH A HIGH LEVEL OF ADHESION ON PLASTICS MATERIALS

[75] Inventors: Wolfgang Fischer, Meerbusch; Gerhard Klein, Monheim; Rudolph Hombach, Leverkusen; Wilfried Kniege, Bergisch Gladbach, all of Fed. Rep. of Germany

[73] Assignee: Bayer Aktiengesellschaft, Leverkusen, Fed. Rep. of Germany

[21] Appl. No.: 835,333

[22] Filed: Mar. 3, 1986

Related U.S. Application Data

[62] Division of Ser. No. 737,232, May 23, 1985, Pat. No. 4,605,703.

[30] Foreign Application Priority Data

Jun. 5, 1984 [DE] Fed. Rep. of Germany ....... 3420924

[51] Int. Cl.$^4$ ............................................. C08L 75/00
[52] U.S. Cl. ................................... 525/127; 525/129; 525/130; 525/259; 525/263; 525/292; 525/293
[58] Field of Search ............... 525/259, 292, 293, 263, 525/302, 304, 305, 127, 130, 129

[56] References Cited

U.S. PATENT DOCUMENTS 3,873,640  3/1975  Owston et al. ...................... 525/278

Primary Examiner—Jacob Ziegler
Attorney, Agent, or Firm—Connolly & Hutz

[57] ABSTRACT

This invention relates to radically hardening adhesives, which contain polymerisable isocyanates and which are distinguished by high adhesive capacity on plastics materials.

2 Claims, No Drawings

ADHESIVES WITH A HIGH LEVEL OF ADHESION ON PLASTICS MATERIALS

This is a division of application Ser. No. 737,232 filed May 23, 1985, now U.S. Pat. No. 4,605,703.

This invention relates to radically hardening adhesives, which contain polymerisable isocyanates and which are distinguished by high adhesive capacity on plastics materials.

Adhesives are known, which harden by a radical polymerisation mechanism. These are generally two-component adhesives, the first component of which (adhesive component) normally consists of a solution of elastomers in monomers with a polymerisable double bond, for example esters of acrylic acid or methacrylic acid, the second component of which (hardening component) contains an initiator for triggering off the radical polymerisation.

In the case of the acrylate adhesives of the $2^{nd}$ generation ($2^{nd}$ generation acrylic adhesives, SGA), the adhesive component of which consists of a solution of polymers in radically polymerisable monomers, the adhesive component can, moreover, contain adhesion improver and organic peroxide. The second component, the so-called acceleration component, contains compounds which react with polymerisation initiators.

These adhesives can be used simply in the "no-mix process", since the adhesive- or the acceleration component is applied in each case on one of the sections to be bonded.

Furthermore, in the case of SGA-adhesives, the acceleration component can likewise be formulated as a resin component. In this case, the activators are likewise mixed with the polymerisable monomers and the polymer component (for example, EP-A No. 93 085). This formulation can also take place in the "no-mix process" or both components can be premixed in suitable quantity ratios.

Methylmethacrylate, (meth-)acrylate of ethylene glycol, oligoethylene glycols, bisphenol A, further polyvalent alcohols, polyester-, polyether- and polyurethane (meth-)acrylate are used as polymerisable monomers.

In order to improve cohesion and reduce shrinkage during the hardening process as well as for adjusting the viscosity, polymers are mixed with the monomers in the adhesive component, for example poly(meth)acrylate, polychloroprene, chlorosulphonated polymers (for example chlorosulphonated polyethylene), nitrile rubbers and/or polyurethanes.

The adhesive component contains peroxides, such as benzoyl peroxide, or peresters such as tert. butylperbenzoate as initiator of the radical polymerisation.

Component 2, the acceleration component, contains tertiary aromatic amines as active species, for example dimethylaniline or condensation products of amines and aldehydes.

The known reaction adhesives have a series of favourable properties such as fast hardening at room temperature, flexibility and adhesion to metals without previous treatment of the surfaces and very good combined tension and shear resistance.

The adhesion to substrates can be improved by special additives, for example it is described in the DE-OS No. 2 916 537 that, for example, phosphorus-containing compounds such as methacryloyloxyethylphosphate lead to an improvement in adhesion on metals.

polymerisable carboxylic acids such as acrylic acid and methacrylic acid are preferably added to radically hardenable adhesives for the improvement of adhesive properties.

These adhesives are less suitable for plastics materials such as thermoplasts, for example polyacetates, polyacrylates, polyamides, and polyimides, polyaryls, celluloses, saturated polyesters, polyolefins, halogenated polyolefins, polystyrenes and polyvinyl acetates, duroplasts, for example amino resins, imide resins, epoxide resins, phenol resins and unsaturated polyester resins. Only insufficient adhesion is achieved on plastics materials by addition of the known adhesion improvers such as methacrylic acid.

The insufficient adhesion of adhesive and substrate arises through previous treatment, for example mechanical measures such as roughening with emery paper or sand blasting. This results, however, in damage to the material and renders adhesive surfaces adsorptive to water and solvents. Furthermore, according to the DE-PS No. 2 340 474, a pretreatment- or grounding agent can be applied to polyester- or thermoplastic substrates, so that better results are thereby achieved. These grounding agents consist of a special urethane addition compound.

In order to increase the adhesion of plastics material surfaces, it is likewise usual to subject these surfaces to an electric discharge, such as corona- or plasma treatment.

Mechanical pretreatment, use of grounding agents as well as the treatment of surfaces to be bonded by means of electric discharge, are costly processes.

It has now been found, that by addition of radically polymerisable isocyanates to acrylate adhesives, the adhesion thereof on plastics materials is improved without pretreatment of the plastics materials being necessary.

Thus an object of the invention are two-component adhesives of
(a) from 5 to 70 parts by weight of polymer
(b) from 20 to 80 parts by weight of reactive diluent with a polymerisable group,
(c) from 1 to 10 parts by weight of reactive diluent with several polymerisable groups,
(d) from 5 to 50 parts by weight of polymerisable isocyanate,
(e) from 1 to 10% by weight of peroxidic compound, based on the sum of the compositions (a) to (d), as component 1 and activators and optionally further additives as component 2.

Component 1(a) preferably contains from 20 to 60 parts by weight of polymer, (b) from 30 to 70 parts by weight of reactive diluent with a polymerisable group, (c) from 2 to 10 parts by weight of reactive diluent with several polymerisable groups, (d) from 5 to 20 parts by weight of polymerisable isocyanate and (d) from 2 to 7% by weight of peroxidic compound, based on the sum of the compositions a to d.

The adhesive component 1 contains as polymers (a) according to the invention for example polyacrylates, polymethacrylates, polychloroprene, chlorinated polyethylene, chlorosulphonated polymers, for example chlorosulphonated polyethylene or polychloroprene, acrylonitrile-butadiene rubbers, styrene, butadiene rubbers and ethylene vinyl acetate polymers.

Reactive diluents (b) can be species with a polymerisable group, simple unsaturated compounds, which are polymerisable according to a free radical mechanism, for example esters of (meth-)acrylic acid, which optionally carry functional groups, which do not react with free isocyanate, styrene as well as mono- and polyalkyl styrenes, halogenated monomers such as chlorostyrene and vinylidene chloride.

Compounds with several polymerisable groups (c) can be cross-linking monomers such as oligo(meth-)acrylates based on diols and triols, preferably ethoxylated trismethylolpropane-tris(meth)acrylates, polymerisable isocyanates (d) can correspond to the formula (I) and peroxidic compounds (e) can be, for example, organic peroxides such as benzoylperoxide, tert.-butylperoxide, peresters, hydroperoxides and azobisisobutyric acid dinitrile (AIBN).

As activator compounds of the component 2, which catalyse the decomposition of compounds supplying free radicals into radicals at room temperature, tertiary, aromatic amines, such as N,N-dimethylaniline or condensation products of aldehydes and primary or secondary amines, for example the accelerator Vulazit 576 ® (BAYER AG) (condensation product of aniline and butyraldehyde) can, for example, be used. Component 2 can optionally also contain additives such as solvents and film-forming media.

Suitable isocyanates (d) of component 1 should have at least one free isocyanate function and at least one polymerisable double bond in the molecule, for example reaction products of di- and polyisocyanates with hydroxyalkyl- or aminoalkyl derivatives of (meth)-acrylic acid. Esterisocyanates of the formula (I) are preferred

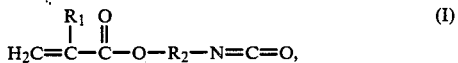

wherein $R_1$ represents hydrogen or alkyl having from 1 to 5 carbon atoms and $R_2$ represents an optionally branched alkylene having from 1 to 7 carbon atoms.

The polymerisable isocyanate-containing adhesion improvers (d) of component 1 preferably have a molecular weight of up to 1000, particularly preferably a molecular weight of up to 500.

Further additives, for example usual components such as fillers, for example oxides, pigments, dyes, paraffinic substances and wetting agents, stabilizers such as small quantities of action oxygen, active oxygen-containing compounds, hydroquinones, further compounds of transition metals or complexes of acetylacetone with Fe, Cu, Co, U, can furthermore be optionally mixed with the adhesives.

The adhesives according to the invention are preferably used as two-component-systems. All given activators or promotors of the radical polymerisation can be mixed for formulation, optionally with solvents as the compound supplying one (activator) component and all polymerisable and polymeric components with a free radical initiator as well as many non-activating additives and stabilizers as the remainder (adhesive component). A further formulation possibility consists, for example, of mixing the activator component as a resin component, that is treating the activators and polymerisation promotors with polymerisable and polymeric components.

The use of two-component adhesives according to the invention takes place in the usual manner according to the "no-mix method".

In principle, both components can also be premixed in a weight ratio of component 1 to component 2 of from 99.9 to 0.1 to 90.0 to 10.0. A range of from 95.0 to 5.0 to 98.0 to 2.0 is preferred. These quantity data with reference to component 2 are based on pure active material.

The adhesives according to the invention are suitable, for example, for bonding to glass fibre-reinforced polyester resins (GF-UP, sheet moulded compounds in low profile-quality), polar, difficultly soluble polymers such as polyamides, which commonly do not adhere without pretreatment.

EXAMPLES

Example 1

Component 1A (adhesive component)

39 g of chlorosulphonated polyethylene (Hypalon 20 ®, Dupont)

56 g of methylmethacrylate 3 g of tetraoxethylated trimethylolpropane-triacrylate 2 g of tert. butlyperbenzoate 0.8 g of saccharin 10 g of isocyanatoethylmethacrylate (Dow-Chemical)

These constitutents of the adhesive component are mixed in a laboratory kneading apparatus with sigma-kneading hooks to produce a homogeneous composition.

Component 1B (comparative adhesive component)

Corresponding to component 1A, an adhesive component is formulated for comparison, which, with otherwise identical composition, contains 10 g of methacrylic acid instead of 10 g of isocyanatoethylmethacrylate.

Component 2 (activator component)

Aniline-butyraldehyde-condensation product (Vulkazit 576 ®, Bayer AG)

Component 1 and component 2 are applied in each case on one of the test samples to be bonded. The test samples are then positioned on each other and loaded for 2 h with a 1 kg weight. After 2 hours the weights are removed and the bonded test sample is left for about 24 h at room temperature. Testing of the combined tension and shear resistance then takes place according to DIN 53 283.

Strips with the measurements 20×40×4 mm are used as test samples. The overlapping surface is 20×10 mm.

| Test sample | Combined tension and shear resistance N/mm² | |
|---|---|---|
| | Component 1A | Component 1B (comparison) |
| Leguval (GF-UP) ® | 7.8 | 2.5 |
| Durethan (PA 6) ® | 7.9 | 5.4 |
| Makrolon (PC) ® | 7.9 | 6.3 |

Example 2

Component 1 (adhesive component)

39 g of chlorosulphonated polyethylene (Hypalon 20 ®, Dupont)

56 g of methylmethacrylate 3 g of tetraoxethylated trimethylolpropane-triacrylate 2 g of tert. butylperbenzoate 0.8 g of saccharin
alternatively:
A—10 g of isocyanatoethylmethacrylate (Dow-Chemical)
B—10 g of 4-isocyanato-3-methyl-but-2-yl-acrylate
C—10 g of reaction product of: 1 mol of hydroxyethylmethacrylate and 1 mol of Desmodur N (triisocyanate)
D—(comparison) 10 g of methacrylic acid Component 2 (accelerator component)
Aniline-butyraldehyde-condensation product (Vulkazit 576 ®, Bayer AG).

During bonding, the procedure is as according to Example 1. The described glass fibre-reinforced UP-resin (Leguval) ®-strips act as test samples.

|  | Combined tension and shear resistance of GF-UP/N/mm$^2$ |
| --- | --- |
| Component 1 A | 7.8 |
| Component 1 B | 7.0 |
| Component 1 C | 4.2 |
| Component 1 D (comparison) | 2.5 |

Example 3

Component 1 (adhesive component)
30 g of chlorosulphonated polychloroprene (1% S, 41% Cl)
67 g of methylmethacrylate
3 g of tetraoxethylated trimethylolpropane-triacrylate
4 g of lucidol CH-50 ® (Akzo Chemie)/dibenzoylperoxide in 50% of stabilizing agent)
alternatively:
A—10 g of isocyanatoethylmethacrylate (Dow-Chemical)
B—10 g of 4-isocyanto-3-methyl-but-2-yl-acrylate
C—(comparison) 10 g of methacrylic acid Component 2 (activator component)
3 g of N,N-dimethylaniline
1 g of N,N-bishydroxyethyl-p-toluidine During bonding, the procedure is as according to Example 1. The described glass fibre-reinforced UP-resin (Leguval) ®-strips are used as test samples.

|  | Combined tension and shear resistance of GF-Up/N/mm$^2$ |
| --- | --- |
| Component 1 A | 5.9 |
| Component 1 B | 5.1 |
| Component 1 C (comparison) | 3.2 |

Example 4

Component 1 (adhesive component)
40 g of ethylene-vinylactate-rubber (40% of vinyl acetate) (Levapren ®, Bayer AG)
60 g of methylmethacrylate
3 g of tetraoxethylated trimethylolpropane-triacrylate
4 g of Lucidol CH-50 ® (Akzo-Chemie) (dibenzoylperoxide in 50% of stabilizing agent)
alternatively:
A—10 g of isocyanatoethylmethacrylate (Dow-Chemical)
B—10 g of 4-isocyanato-3-methyl-but-2-yl-acrylate
C—(comparison) 10 g of methacrylic acid Component 2 (activator component)
3 g of N,N-dimethylaniline
1 g of N,N-bishydroxyethyl-p-toluidine During bonding, the procedure is as according to Example 1. The described glass fibre-reinforced UP-resin (Leguval) ®-strips act as test samples.

|  | Combined tension and shear resistance of GF-UP/N/mm$^2$ |
| --- | --- |
| Component 1 A | 4.5 |
| Component 1 B | 4.0 |
| Component 1 C (comparison) | 1.7 |

We claim:

1. Two-component adhesives comprising as a first component parts (a) to (e) as follows:
   (a) from 5 to 70 parts by weight of polymer,
   (b) from 20 to 80 parts by weight of reactive diluent with a polymerizable group,
   (c) from 1 to 20 parts by weight of reactive diluent with several polymerizable groups,
   (d) from 5 to 50 parts by weight of polymerizable isocyanate of the formula

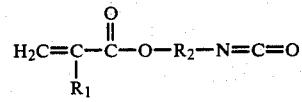

wherein
   $R_1$ represents hydrogen or alkyl having from 1 to 5 carbon atoms and
   $R_2$ represents straight chain or branched alkylene having from 1 to 10 carbon atoms, and
   (e) from 1 to 10% by weight of peroxidic compound, based on the sum of the parts of (a) to (d)
and as a second component, an activator comprising a tertiary aromatic amine.

2. Radically hardening adhesive according to claim 1, characterised in that the polymerisable isocyanate has a molecular weight of up to 500.

* * * * *